(12) United States Patent
Hamada et al.

(10) Patent No.: US 7,314,299 B2
(45) Date of Patent: Jan. 1, 2008

(54) VEHICLE LAMP AND METHOD OF MANUFACTURING THE VEHICLE LAMP

(75) Inventors: Koji Hamada, Isehara (JP); Ryuuichirou Kotaki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 129 days.

(21) Appl. No.: 10/899,459

(22) Filed: Jul. 27, 2004

(65) Prior Publication Data

US 2005/0052881 A1   Mar. 10, 2005

(30) Foreign Application Priority Data

Jul. 31, 2003   (JP) .............................. 2003-284430

(51) Int. Cl.
*B60Q 1/26* (2006.01)

(52) U.S. Cl. ...................... 362/540; 362/507; 362/520; 362/244; 362/326

(58) Field of Classification Search ................ 362/540, 362/543, 544, 507, 520, 521, 244, 326, 309; 29/446, 450, 451; 392/419–427

See application file for complete search history.

(56) References Cited

U.S. PATENT DOCUMENTS 5,490,049 A * 2/1996 Montalan et al. ........... 362/240

FOREIGN PATENT DOCUMENTS

JP    11-134903 A    5/1999

* cited by examiner

*Primary Examiner*—Sandra O'Shea
*Assistant Examiner*—Mark Tsidulko
(74) *Attorney, Agent, or Firm*—Foley & Lardner LLP

(57) ABSTRACT

A vehicle lamp includes an inner lens having a rigid structure. The inner lens is elastically fitted into a lamp housing. By securing an outer lens to the lamp housing, the lamp housing is made to have a rigid structure to fix the inner lens thereto. The inner lens is thereby securely fixed, which makes it possible to improve optical precision.

11 Claims, 6 Drawing Sheets

VEHICLE LAMP AND METHOD OF MANUFACTURING THE VEHICLE LAMP

CROSS-REFERENCE TO RELATED APPLICATIONS

The present document incorporates by reference the entire contents of Japanese priority document, 2003-284430 filed in Japan on Jul. 31, 2003.

BACKGROUND OF THE INVENTION

1) Field of the Invention

The present invention relates to a vehicle lamp and a method of manufacturing the vehicle lamp.

2) Description of the Related Art

Typical vehicle lamps include inner lenses. The inner lens controls refraction of light from a light source in a predetermined illumination direction. Such an inner lens is often secured to the lamp housing with screws. However, in that case, some tool, such as a driver, becomes necessary to screw the screws. If the screwing operation is performed using robots, then torque of the screwing has to be controlled. The facts make the assembly of the inner lens difficult.

Japanese Patent Application Laid Open No. H11-134903 discloses a technology to easily assemble the inner lens. Fitting portions are provided in both the inner lens and the lamp housing so as to form the inner lens as a "fit-in" type. Because the inner lens can be elastically fitted in the lamp housing, the inner lens can be easily assembled.

SUMMARY OF THE INVENTION

It is an object of the present invention to solve at least the problems in the conventional technology.

A vehicle lamp according to an aspect of the present invention includes a lamp housing; an outer lens; an inner lens having a rigid structure; and a light source. Moreover, the lamp housing includes an elastic fitting portion into which the inner lens can be elastically fitted, wherein the elastic fitting portion is made to have a rigid structure by securing the outer lens to the lamp housing, and the inner lens is fixed to the elastic fitting portion having the rigid structure.

A method of manufacturing according to another aspect of the present invention is a method of manufacturing a vehicle lamp that includes a lamp housing; an outer lens; and an inner lens having a rigid structure. The method includes manufacturing the inner lens; manufacturing the lamp housing including an elastic fitting portion; elastically fitting the inner lens into the elastic fitting portion; and securing the outer lens to the lamp housing, after the elastically fitting, to cause the elastic fitting portion to have a rigid structure, and fixing the inner lens to the elastic fitting portion having the rigid structure.

The other objects, features, and advantages of the present invention are specifically set forth in or will become apparent from the following detailed description of the invention when read in conjunction with the accompanying drawings.

DETAILED DESCRIPTION

Exemplary embodiments of a vehicle lamp and its manufacture method according to the present invention are explained in detail below with reference to the accompanying drawings. The vehicle lamp can be used as a head lamp and/or a tail lamp of a vehicle. However, for the sake of the explanation, it is assumed here that the vehicle lamp is a tail lamp.

In the explanation below, the front side of the vehicle on which the lamp of the present invention is mounted is defined also as the front side in the lamp, and the opposite side thereto is defined as the rear side therein. Likewise, the upper side of the vehicle is defined also as the upper side in the lamp, and the opposite side thereto is defined as the lower side therein. Furthermore, for the sake of the explanation, it is assumed here that the vehicle lamp is a left-side tail lamp. A right-side tail lamp will be substantially symmetric to the left-side tail lamp, so its explanation will be omitted.

Figure 1:
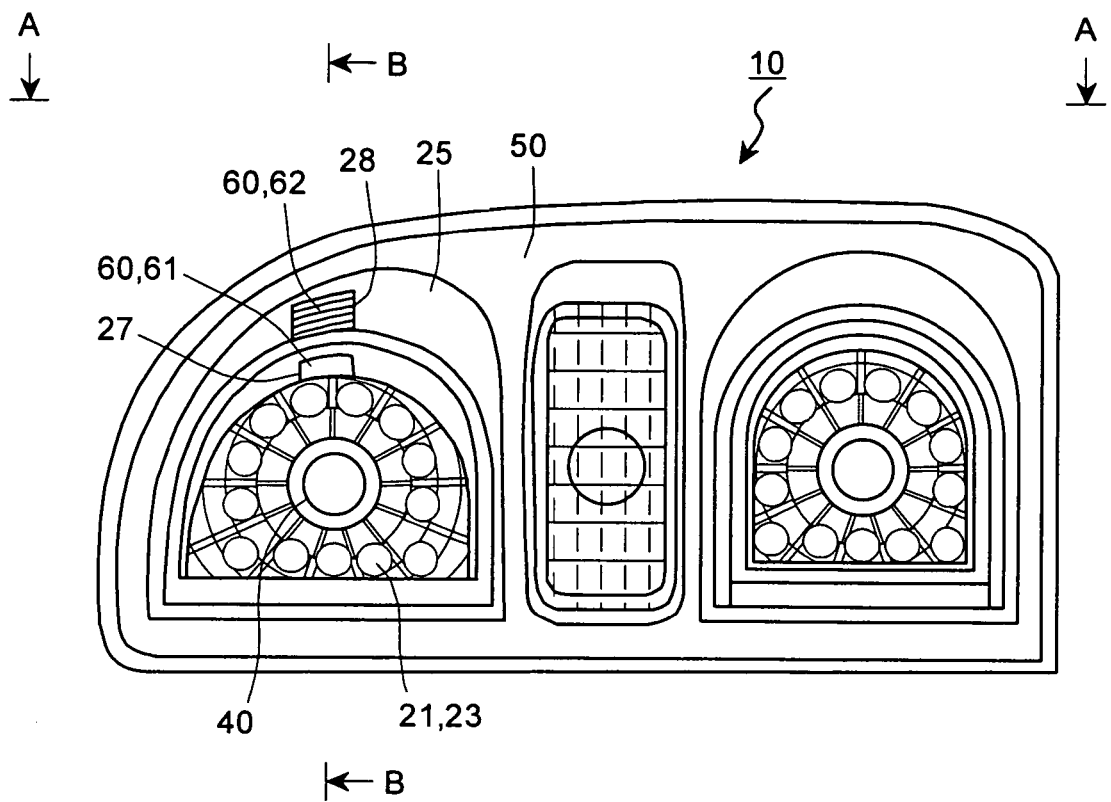
FIG. 1 is a front view of a vehicle lamp according to the present invention.
Figure 2:
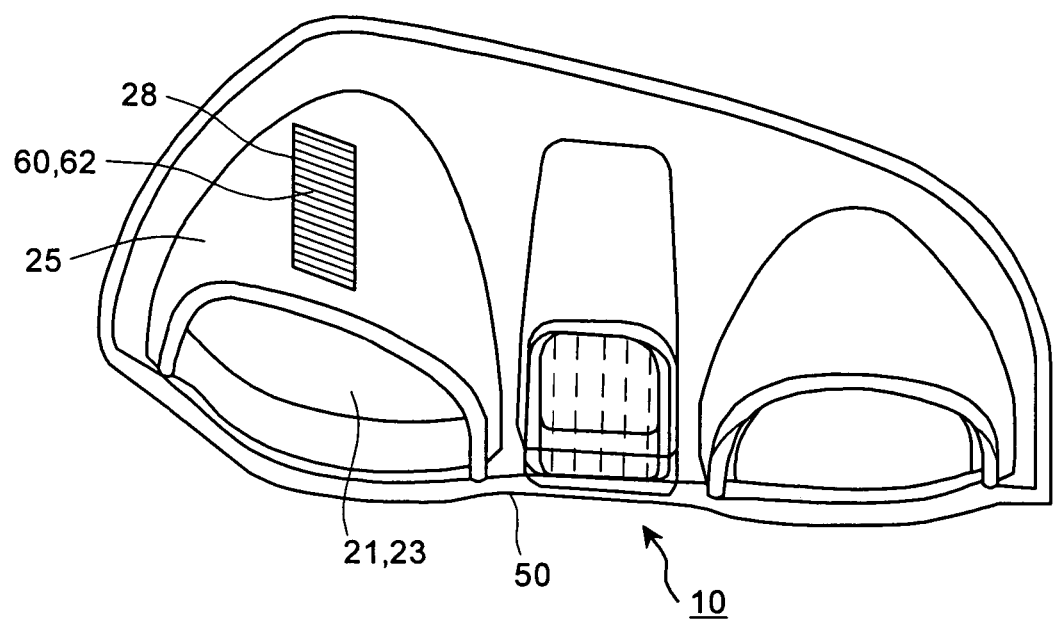
FIG. 2 is a schematic diagram viewed from arrow A-A of FIG. 1.
Figure 3:
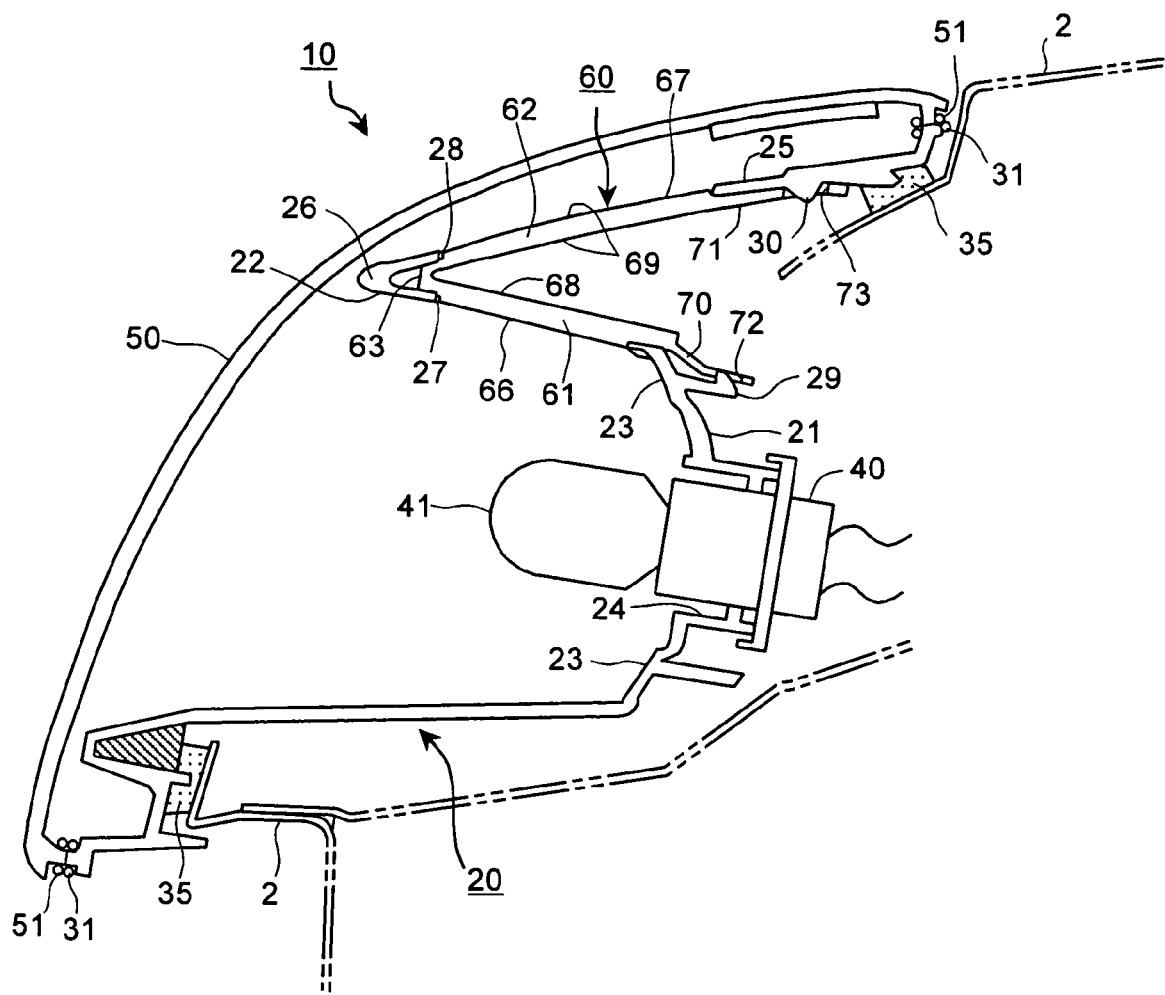
FIG. 3 is a cross section viewed from arrow B-B of FIG. 1.

FIG. 1 is a front view of a vehicle lamp 10 according to an embodiment of the present invention. FIG. 2 is a schematic diagram viewed from arrow A-A of FIG. 1. FIG. 3 is a cross section viewed from arrow B-B of FIG. 1. As shown in FIG. 3, the vehicle lamp 10 (hereinafter, "lamp 10") includes a lamp housing 20 and an outer lens 50 that are integrally secured to a vehicle. The lamp housing 20 includes a reflector 21, and the reflector 21 includes an insertion hole 24 into which a light source valve 40 such as an incandescent lamp is inserted so as to be fixed. A seal member 35 is provided along the outer periphery of the lamp housing 20 on the opposite side to a side where the outer lens 50 is secured. A marker lens 60 (inner lens) (fit-in type lens) is provided on the upper side of the reflector 21. When the lamp 10 is mounted on a vehicle 1 as explained later, the marker lens 60 is used as the marker lens 60 for a rear side marker provided on the left side of the vehicle 1.

Figure 4:
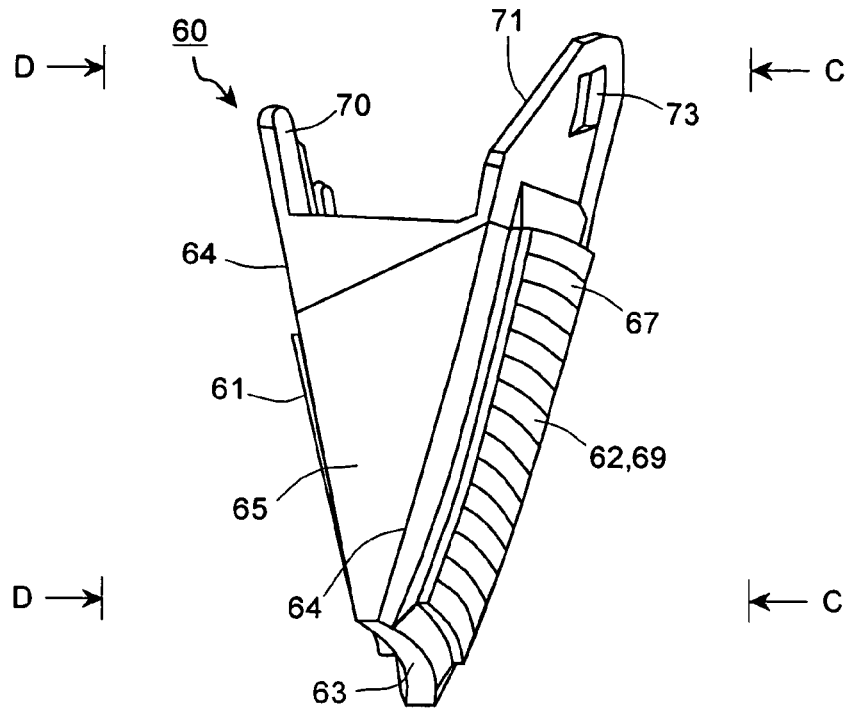
FIG. 4 is a perspective view of a marker lens included in the lamp of FIG. 1.
Figure 5:
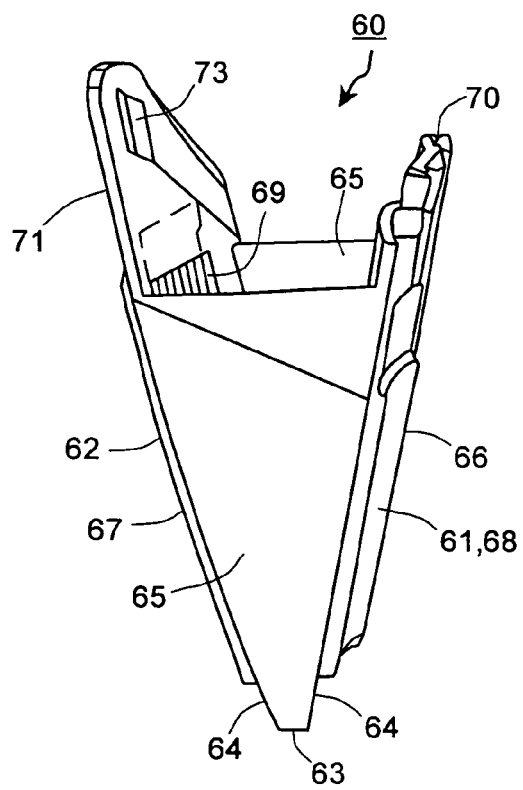
FIG. 5 is a perspective view of the marker lens of FIG. 4 when viewed from other side.
Figure 6:
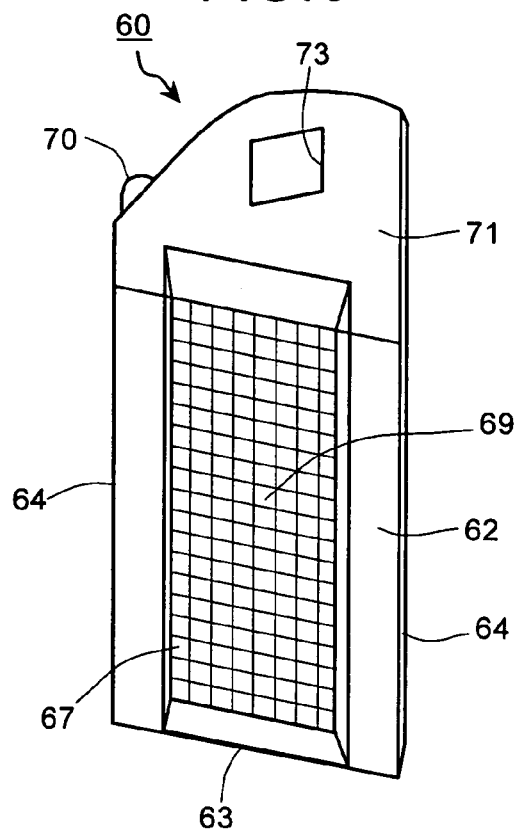
FIG. 6 is a schematic diagram of the marker lens viewed from arrow C-C of FIG. 4.
Figure 7:
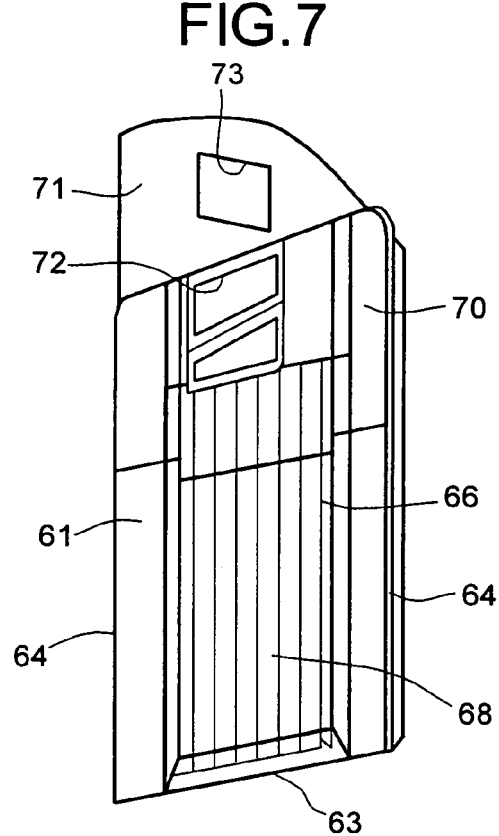
FIG. 7 is a schematic diagram of the marker lens viewed from arrow D-D of FIG. 4.

FIG. 4 is a perspective view of the marker lens included in the lamp 10. FIG. 5 is a perspective view of the marker lens of FIG. 4 when viewed from another direction. FIG. 6 is a schematic diagram viewed from arrow C-C of FIG. 4. FIG. 7 is a schematic diagram viewed from arrow D-D of FIG. 4. The marker lens 60 is formed as a rigid element made of a material such as a clear and colorless resin, and includes two lenses of a light-receiving lens 61 and a light-emitting lens 62.

Both of the lenses are formed in a substantially rectangular tabular-shape. The two tabular lenses are jointed to form an acute angle at an angle portion 63 as a vertex. A rigid wall portion 65 is provided between one side portions 64 of the two tabular lenses. In other words, one of the sides of the two lenses each rectangularly formed are jointed at the angle portion 63, and the rigid wall portion 65 is provided between the one side portions 64 of the two tabular lenses. One of the side portions 64 extends along both ends of a side of the lens, and the other side portion 64 is a corresponding side of the other lens, and these two side portions 64 form the angle portion 63.

In short, the two lenses have two pairs of the side portions 64, and therefore, two sheets of rigid wall portion 65 are provided between them. Furthermore, the rigid wall portion 65 is formed in a substantially triangularly tabular shape in which one of the angles is equal to the acute angle formed with the two lenses.

A fitting portion is formed in the light receiving lens 61 and the light emitting lens 62, respectively. A light-receiving-lens fitting portion 66 is formed in the light receiving lens 61, while a light-emitting-lens fitting portion 67 is formed in the light emitting lens 62. The two fitting portions are provided on outside planes of the two lenses. In other words, the two fitting portions are provided on the sides opposite to the side that is surrounded by the two lenses and the two rigid wall portions 65. Furthermore, the two fitting portions are formed in a substantially rectangular convex-shape. Moreover, both of the light receiving lens 61 and light emitting lens 62 have lens planes with a shape like a Frenel-lens. Specifically, a light-receiving-lens plane 68 is formed on the light receiving lens 61, and a light-emitting-lens plane 69 is formed on the light emitting lens 62.

The light-receiving-lens plane 68 is formed on the plane of the light receiving lens 61 on the side that faces the light emitting lens 62. The light-emitting-lens plane 69 is formed on both the plane of the light emitting lens 62 on the side that faces the light receiving lens 61 and the plane opposite to the side. The light-receiving-lens plane 68 and the light-emitting-lens plane 69 may have any shape other than the Frenel-lens like a prism if it can change the direction of light to a predetermined direction.

Engaging plates are provided on the sides of the two lenses that are opposite to the angle portion 63. The engaging plates extend along the direction opposite to the angle portion 63. More specifically, a light-receiving-lens engaging plate 70 is provided in the light receiving lens 61, while a light-emitting-lens engaging plate 71 is provided in the light emitting lens 62. A substantially rectangular engaging hole is made on each of the engaging plates. Specifically, a light-receiving-lens engaging hole 72 is made on the light-receiving-lens engaging plate 70, while a light-emitting-lens engaging hole 73 is made on the light-emitting-lens engaging plate 71.

The lamp housing 20 as shown in FIG. 3 is made of a material such as resin so as to be elastically formed, which makes the lamp housing 20 deformable. The plane of a concave side of the reflector 21 provided on the lamp housing 20 is formed in a shape as a part of a substantially paraboloidal shape that faces the outer lens 50. The insertion hole 24 for the light source valve 40 is formed near the vertex of the paraboloid that forms the reflector 21. A reflecting surface 23 is formed on the internal plane of the reflector 21. Alternatively, the reflecting surface 23 is formed on a side where a bulb 41 of the light source valve 40 is positioned when the light source valve 40 is inserted into and fixed to the insertion hole 24. The reflecting surface 23 is formed with a free-form surface and is subjected to treatment such as aluminum evaporation.

A portion into which the marker lens 60 is fitted is provided on the upper side of the reflector 21. More specifically, a lamp-housing upper wall 25 is provided along the upper side of the reflector 21 from a reflector front end 22 toward a direction opposite to the reflection direction of light from the light source valve 40. The lamp-housing upper wall 25 and the reflector 21 are jointed so as to form a lamp-housing angle portion 26 that is an acute angle. The marker lens 60 is fitted into the lamp housing 20 from a space between the reflector 21 and the lamp-housing upper wall 25. It is noted that the reflector 21 and the lamp-housing upper wall 25 form an elastic fitting portion.

A light-receiving-lens fitting hole 27 is provided on the upper side of the reflector 21. The light-receiving-lens fitting hole 27 has a shape similar to a rectangle of the light-receiving-lens fitting portion 66 formed on the marker lens 60, but the shape is slightly larger than the rectangle. A light-emitting-lens fitting hole 28 is provided on the lamp-housing upper wall 25. Similarly to the light-receiving-lens fitting hole 27, the light-emitting-lens fitting hole 28 has a shape similar to a rectangle of the light-emitting-lens fitting portion 67 formed on the marker lens 60, but the shape is slightly larger than the rectangle.

A light-receiving-lens-side engaging portion 29 is provided on the upper side of the reflector 21 that is on the plane opposite to the reflecting surface 23. The light-receiving-lens-side engaging portion 29 has a projection provided on the top surface of the edge of a rectangular plate. The rectangular plate is extended from the reflector 21 toward the direction opposite to the reflector front end 22. One side of the projection that is directed toward the reflector front end 22 is substantially vertically formed like a wall, while another side of the projection that is directed toward the opposite side to the reflector front end 22 is sloped from a higher part to a lower part.

A light-emitting-lens-side engaging portion 30 is provided in a position that is farther than the light-emitting-lens fitting hole 28 in the direction opposite to the reflector front end 22. The light-emitting-lens-side engaging portion 30 is projected downwardly. The projection is substantially isosceles triangular in cross section, and the angle between two equal sides is formed downwardly.

A lamp-housing joint portion 31 that is a joint portion with the outer lens 50 is provided on the outer periphery of the lamp housing 20 when viewed from the side toward which the reflecting surface 23 is directed. Furthermore, the seal member 35 is provided on the outer periphery of the lamp housing 20 when viewed from the side opposite to the side toward which the reflecting surface 23 is directed.

As shown in FIG. 3, the outer lens 50 is provided on the side toward which the reflecting surface 23 is directed with respect to the lamp housing 20. In other words, the outer lens 50 is provided on the side in the reflection direction of light from the light source valve 40. The outer lens 50 is further extended from this position toward the upper side of the lamp housing 20 while being bent toward the lamp-housing upper wall 25. The outer lens 50 is made of a material such as a clear and red colored resin and is formed as a rigid element. An outer-lens joint portion 51 that is a joint portion with the lamp housing 20 is provided on the outer periphery of the outer lens 50 when viewed from the side of the lamp housing 20.

Figure 8:
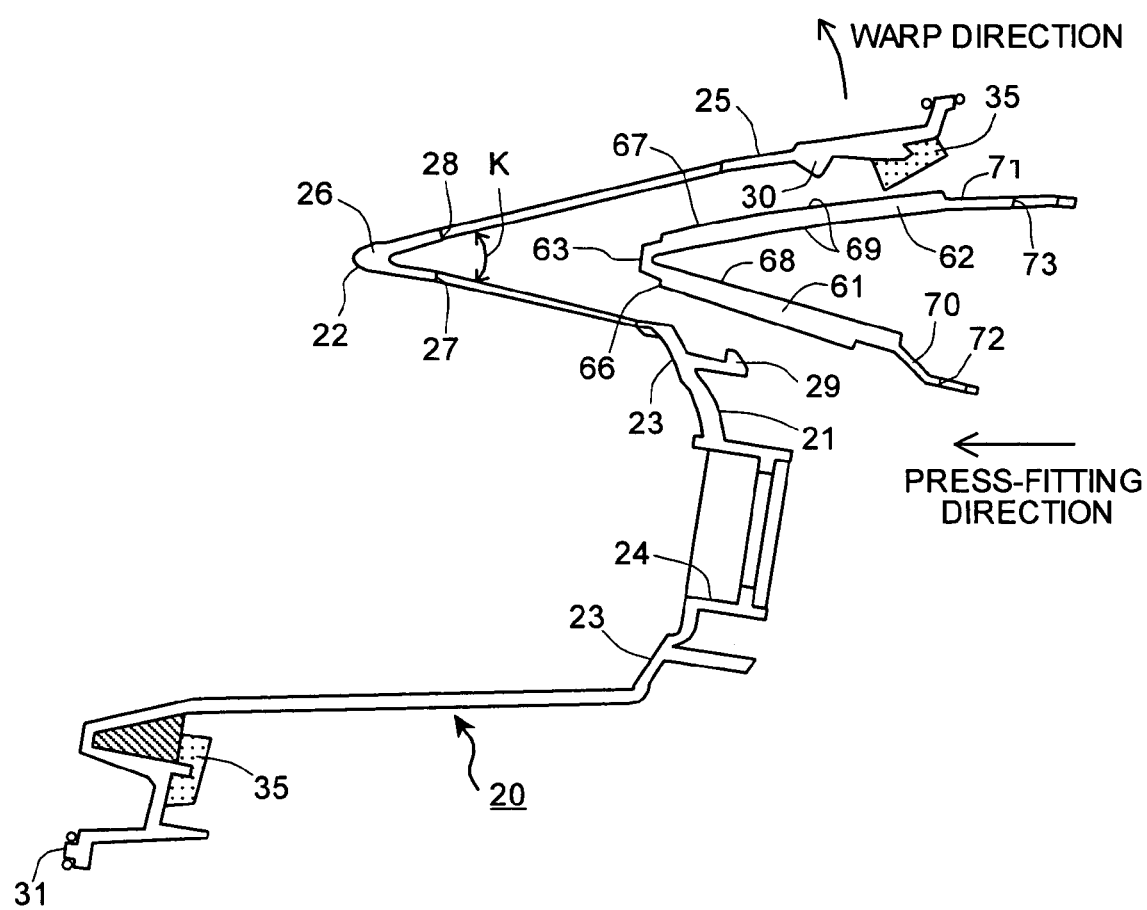
FIG. 8 is an assembly diagram of the lamp of FIG. 1.

The lamp 10 according to the embodiment is configured as explained above, and how to assemble the lamp 10 is explained below. FIG. 8 is an assembly diagram of the lamp 10 of FIG. 1. For assembling the lamp 10, the marker lens 60 is assembled to the lamp housing 20 before the lamp housing 20 and the outer lens 50 are jointed. The marker lens 60 is assembled thereto through a space between the reflector 21 on the side where the seal member 35 is provided and the lamp-housing upper wall 25. The marker lens 60 is assembled between the reflector 21 and the lamp-housing upper wall 25 where the light-receiving-lens fitting hole 27 is provided and the light-emitting-lens fitting hole 28 is provided. The marker lens 60 is assembled by directing the angle portion 63 thereof toward the lamp housing 20. The marker lens 60 is inserted from the space between the reflector 21 and the lamp-housing upper wall 25 by facing the light receiving lens 61 toward the reflector 21 and by facing the light emitting lens 62 toward the lamp-housing upper wall 25.

In other words, when the marker lens 60 is inserted from the space, the rigid wall portion 65 is directed toward an angle k of the lamp-housing angle portion 26 that is formed with the reflector 21 and the lamp-housing upper wall 25. By inserting the marker lens 60 thus directed into the space, the marker lens 60 comes in contact with mutually facing planes of the reflector 21 and the lamp-housing upper wall 25. By further inserting the marker lens 60 thereinto, the lamp housing 20 is elastically deformed because the marker lens 60 is formed with the rigid element and the lamp housing 20 is formed with the elastic element.

More specifically, when the marker lens 60 is inserted in the above manner, the light-receiving-lens engaging plate 70 comes in contact with the light-receiving-lens-side engaging portion 29 provided on the reflector 21, while the light-emitting-lens engaging plate 71 comes in contact with the light-emitting-lens-side engaging portion 30 provided on the lamp-housing upper wall 25. The marker lens 60 is further inserted into the space between the reflector 21 and the lamp-housing upper wall 25 by applying force to the marker lens 60, that is, the marker lens 60 is press-fitted thereinto. The force is thereby applied to the lamp housing 20 in the direction in which the reflector 21 and the lamp-housing upper wall 25 are separated from each other.

In other words, both the reflector 21 and the lamp-housing upper wall 25 are applied with the force in the direction in which the angle k of the lamp-housing angle portion 26 is increased. In order to fit the increase, the rigid wall portion 65 is formed in a shape fitting along the increase direction of the angle k or along the warp direction of the lamp housing 20. Therefore, even when being press-fitted in the above manner, the marker lens 60 is not deformed because of rigidity in the direction of the angle k. As a result, the force can be applied to both the reflector 21 and the lamp-housing upper wall 25 in the increase direction of the angle k.

Consequently, the lamp housing 20 is elastically deformed to cause the angle k of the lamp-housing angle portion 26 to increase, and is warped in the direction where the reflector 21 and the lamp-housing upper wall 25 are separated from each other. As a result, the marker lens 60 can further be press-fitted even after coming in contact with the lamp housing 20. By further press-fitting the marker lens 60 in the direction as explained above, the light-receiving-lens engaging hole 72 reaches the light-receiving-lens-side engaging portion 29, and the light-emitting-lens engaging hole 73 reaches the light-emitting-lens-side engaging portion 30. At this time, the light-receiving-lens-side engaging portion 29 is about to be engaged in the light-receiving-lens engaging hole 72, and the light-emitting-lens-side engaging portion 30 is about to be engaged in the light-emitting-lens engaging hole 73. Therefore, the force to widen the space between the reflector 21 and the lamp-housing upper wall 25 is released.

By the release, the lamp housing 20 warped by being elastically deformed recovers to its original shape, and a positional relation between the reflector 21 and the lamp-housing upper wall 25 returns to the state before the marker lens 60 is press-fitted thereinto. The recovery of the reflector 21 and the lamp-housing upper wall 25 to their initial shapes in the above manner causes the light-receiving-lens-side engaging portion 29 to be engaged in the light-receiving-lens engaging hole 72, and also causes the light-emitting-lens-side engaging portion 30 to be engaged in the light-emitting-lens engaging hole 73.

When the light-receiving-lens engaging hole 72 reaches the light-receiving-lens-side engaging portion 29, the light-receiving-lens fitting. portion 66 also reaches the light-receiving-lens fitting hole 27 provided in the reflector 21. Likewise, when the light-emitting-lens engaging hole 73 reaches the light-emitting-lens-side engaging portion 30, the light-emitting-lens fitting portion 67 also reaches the light-emitting-lens fitting hole 28.

Thereafter, the lamp housing 20 warped caused by elastic deformation returns to its original shape, which causes the light-receiving-lens-side engaging portion 29 to be engaged in the light-receiving-lens engaging hole 72 in the above manner. At the same time, the light-receiving-lens fitting portion 66 is fitted into the light-receiving-lens fitting hole 27. Likewise, the lamp housing 20 warped caused by elastic deformation returns to its original shape, which causes the light-emitting-lens-side engaging portion 30 to be engaged in the light-emitting-lens engaging hole 73 in the above manner. At the same time, the light-emitting-lens fitting portion 67 is fitted into the light-emitting-lens fitting hole 28. As a result, the marker lens 60 is mounted on the lamp housing 20.

After the marker lens 60 is mounted on the lamp housing 20, the outer lens 50 is jointed to the lamp housing 20. More specifically, both the lamp-housing joint portion 31 and the outer-lens joint portion 51 are heated to cause the heated portions to be softened, and the outer lens 50 is jointed to the lamp housing 20 under their softened state. Accordingly, the lamp-housing joint portion 31 and the outer-lens joint portion 51 are welded to secure the outer lens 50 to the lamp housing 20. By securing the outer lens 50 to the lamp housing 20, the reflector 21 and the lamp-housing upper wall 25 that function as the elastic fitting portion are caused to have a rigid structure. As a result, the marker lens 60 having the rigid structure is secured to the reflector 21 and the lamp-housing upper wall 25 both of which have the rigid structure.

Figure 9:
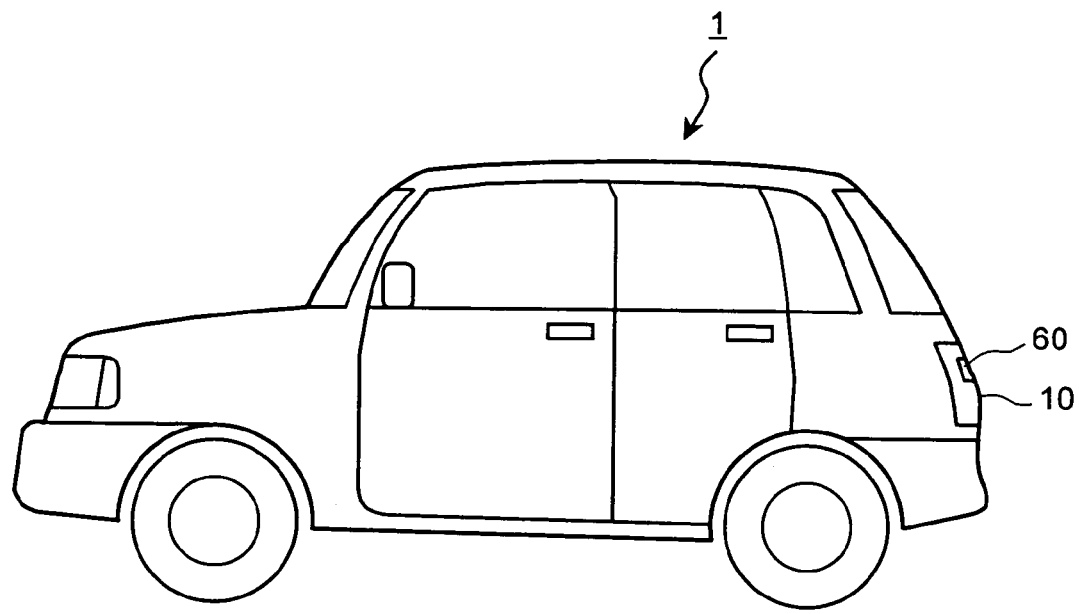
FIG. 9 is a side view of a vehicle mounted with the lamp of FIG. 1.
Figure 10:
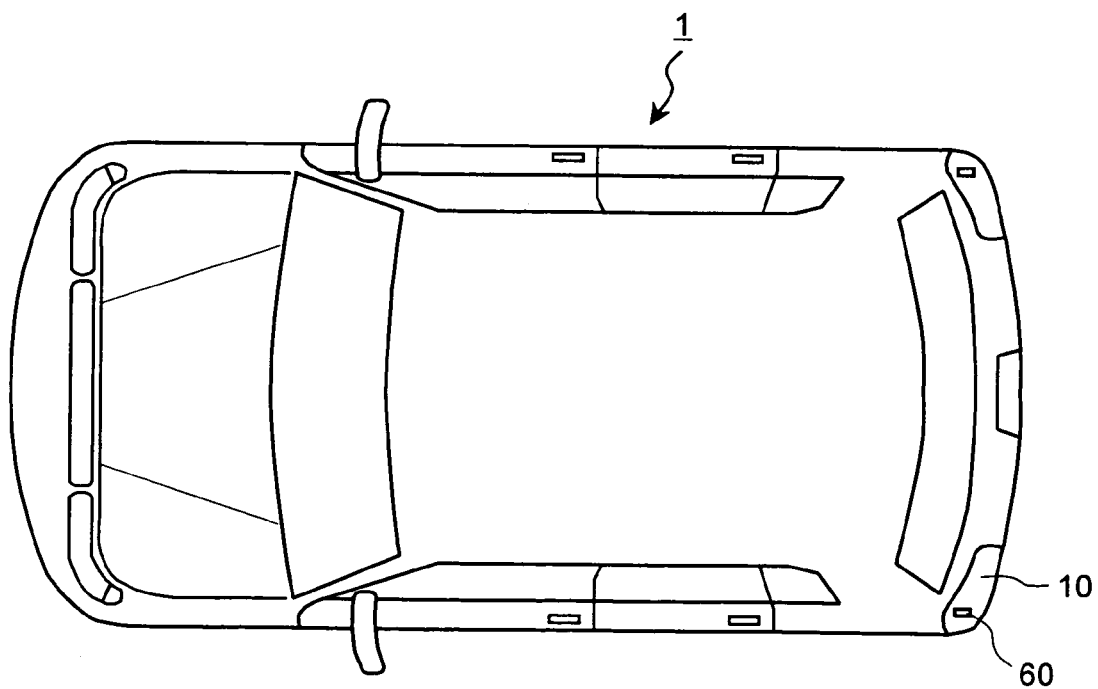
FIG. 10 is a plan view of the vehicle mounted with the lamp of FIG. 1.

FIG. 9 is a side view of a vehicle mounted with the lamp 10. FIG. 10 is a plan view of the vehicle. The light source valve 40 is inserted through the insertion hole 24 provided in the reflector 21 as shown in FIG. 1. More specifically, the bulb 41 of the light source valve 40 is first inserted into the insertion hole 24 from the side opposite to the reflecting surface 23, and the light source valve 40 is fixed with a bayonet mechanism or the like. In such a manner, the light source valve 40 is detachably fixed to the lamp housing 20. The lamp 10 thus assembled is mounted on the vehicle 1.

The lamp 10 is used as a tail lamp or a rear side marker on the rear left side of the vehicle 1, and therefore, it is mounted on the left side of the rear side of the vehicle 1. The mounting is carried out by facing the seal member 35 toward a vehicle-side mounting portion 2 and fixing it to the vehicle-side mounting portion 2. By providing the seal member 35 between the vehicle-side mounting portion 2 and the lamp housing 20, it is possible to maintain the water-tightness of the lamp 10 from the outside to the side into which the light source valve 40 is inserted.

When the light source valve 40 of the lamp 10 fixed to the vehicle 1 is turned on, the most part of the light from the light source valve 40 is reflected once by the reflecting surface 23 or directly passes through the outer lens 50, and then is illuminated toward the outside. Some light, of the light from the light source valve 40, directed toward the direction of the light-receiving-lens fitting hole 27 is incident to the marker lens 60 through the light receiving lens 61.

The light to be incident to the marker lens 60 is incident while being diffused, but the direction of the light is adjusted by the light-receiving-lens plane 68. The light with the direction adjusted is emitted once from the marker lens 60 and directed from between the light receiving lens 61 and the light emitting lens 62 toward the light emitting lens 62. The light directed toward the light emitting lens 62 is incident again to the marker lens 60 through the light emitting lens 62.

Since the light-emitting-lens plane 69 is provided on the light emitting lens 62, the direction of the light is changed by the light-emitting-lens plane 69, and the light is illuminated in a predetermined illumination direction while being diffused when the light is emitted from the marker lens 60. Furthermore, when the light emitted from the marker lens 60 is to be illuminated to the outside, the light emitted from the marker lens 60 passes through the outer lens 50. This outer lens 50 is made of a clear and red colored material. Therefore, when passing through the outer lens 50, the light is red-colored to obtain a red colored light, and the red colored light is illuminated to the outside.

The lamp 10 is mounted on the rear left side of the vehicle 1, and the marker lens 60 included therein is used as the marker lens 60 for a rear-side side marker on the left side of the vehicle 1. Therefore, the light from the marker lens 60 is illuminated as an illumination light that is suitable for a range of light illuminated from the rear-side side marker on the left side of the vehicle 1. More specifically, the light is illuminated from the marker lens 60 provided on the rear left side of the vehicle 1 toward the side in the leftward direction of the vehicle 1 within a predetermined range.

As explained above, the lamp 10 includes the lamp housing 20, the outer lens 50, the marker lens 60, and the light source valve 40, i.e., the light source. The inner lens has the rigid structure. The lamp housing 20 includes the elastic fitting portion into which the marker lens 60 is elastically fitted. By securing the outer lens 50 to the lamp housing 20, the elastic fitting portion is caused to have the rigid structure. The elastic fitting portion having the rigid structure secures the marker lens 60 having the rigid structure.

In other words, when the marker lens 60 is to be mounted on the lamp housing 20, by press-fitting the rigid marker lens 60 into the elastic fitting portion of the elastic lamp housing 20, the marker lens 60 is elastically fitted into the lamp housing 20 and mounted thereon. The marker lens 60 is only press-fitted into the lamp housing 20 in the above manner without using any tool such as a driver, which allows the marker lens 60 to be easily mounted on the lamp housing 20. As a result, it is possible to easily assemble the lamp 10. Furthermore, there is no need to use any component for fixture such as a screw, which makes it possible to reduce costs accordingly.

The marker lens 60 is mounted on the lamp housing 20, and then the outer lens 50 that is rigid is secured to the lamp housing 20 that is elastic, which causes the lamp housing 20 to be rigid. Accordingly, no warp occurs in the lamp housing 20, and the marker lens 60 is thereby prevented from being dismounted from the lamp housing 20. As a result, the marker lens 60 is securely fixed. The process of fixing the outer lens 50 to the lamp housing 20 in the above manner is also carried out in the conventional lamp 10, that is, it is not a new operation process for the fixture.

As explained above, the new operation process for securely fixing the marker lens 60 to the lamp housing 20 is not provided but the conventional operation process is allowed to have a new effect, so that the marker lens 60 is securely fixed to the lamp housing 20. As a result, an increase in costs due to an increase in the new operation process can be suppressed. Moreover, the marker lens 60 is more securely fixed without an increase in costs, which makes it possible to obtain the quality of the fixture equivalent to that of a mechanical joint using a component such as a screw, although the fixture is the fit-in type.

Furthermore, the marker lens 60 is fixed to the lamp housing 20 using the fit-in, and the fit-in is carried out not by warping the marker lens 60 but by warping the lamp housing 20. Therefore, the relative positional relationship between the light receiving lens 61 and the light emitting lens 62 provided on the marker lens 60 is not changed. As a result, the marker lens 60 can be mounted on the lamp housing 20 while the positional relationship between them that has been optically designed can be maintained. Thus, the marker lens 60 can be mounted on the lamp housing 20 while an illumination range of light through the marker lens 60 is made the most appropriate.

In the lamp 10, the marker lens 60 includes the rigid wall portion 65 provided in the elastic direction of the elastic fitting portion, and the two lenses that are integrally formed through the rigid wall portion 65 and that control light from the light source so as to be illuminated in a predetermined direction.

In other words, the marker lens 60 is formed as a rigid structure such that the rigid wall portion 65 is provided between the light receiving lens 61 and the light emitting lens 62. Therefore, the relative positional relationship between the light receiving lens 61 and the light emitting lens 62 can be securely maintained. As a result, it is possible to improve the precision of the illumination direction of the light controlled by the marker lens 60.

In the lamp 10, the light source is used as a light source for a tail vehicle lamp, and the marker lens 60 controls the light from the light source so as to be illuminated in the direction suitable for the illumination direction of a rear-side side marker.

In other words, the marker lens 60 is used as the marker lens 60 for the rear-side side marker. Furthermore, the marker lens 60 is mounted on the lamp 10 that is used as the tail lamp mounted on the rear side of the vehicle 1, and the light source valve 40 and the outer lens 50 are shared with the tail lamp. Therefore, the light source valve 40 for the rear-side side marker and the light source valve 40 for the tail lamp are commonly used. The outer lens 50 for the tail lamp colors the light illuminated from the rear-side side marker so as to obtain a red colored light. As a result, it is possible to reduce the number of components for the rear-side side marker and reduce the costs.

By using the marker lens 60 with the light receiving lens 61 and the light emitting lens 62 combined as the marker lens 60 for the rear-side side marker, the rear-side side marker can be provided in a narrow portion. Even in this case, a wide range can be illuminated with light. Further, by using the marker lens 60 for the rear-side side marker, an appropriate range can be illuminated with light. Therefore, it is possible to prevent glaring light toward other vehicles. Furthermore, the rear-side side marker can be provided inside the lamp on the rear side of the vehicle 1. Therefore, there is no need to provide a space for a new rear-side side marker, which makes it possible to improve the space utilization and improve the flexibility of design of vehicles.

In the method of manufacturing the lamp 10, the lamp 10 includes the lamp housing 20, the outer lens 50, and the marker lens 60, and the method includes steps as follows. That is, the method includes manufacturing the marker lens 60 having the rigid structure, manufacturing the lamp housing 20 with the elastic fitting portion, and elastically fitting the marker lens 60 having the rigid structure into the elastic fitting portion. The method also includes fixing the outer lens 50 to the lamp housing 20 after the elastically fitting to make the elastic fitting portion have the rigid structure, and fixing the marker lens 60 with the rigid structure to the elastic fitting portion with the rigid structure.

In other words, the marker lens 60 is manufactured so as to have the rigid structure, and the marker lens 60 is elastically fitted into the elastic fitting portion of the lamp housing 20. It is thereby easy to mount the marker lens 60 on the lamp housing 20. After the elastically fitting, the outer lens 50 is fixed to the lamp housing 20, which causes the elastic fitting portion of the lamp housing 20 to have the rigid structure. It is thereby possible to securely fix the marker lens 60 to the lamp housing 20. Consequently, the marker lens 60 is easily assembled yet securely fixed, which makes it possible to reduce costs caused by removal of unnecessary components for fixture such as screws, and to improve quality of fixture caused by an increase in fixing reliability. Moreover, the marker lens 60 is made to have the rigid structure, which makes it possible to obtain the vehicle lamp with improved precision of a light illumination direction.

Although the marker lens 60 according to the embodiment is used as the marker lens 60 for rear-side side marker, the marker lens 60 may be used as a lens for other lamps. Even if the marker lens 60 is used as the lens for other lamps, the lens can be assembled easily and securely. Further, although the light source valve 40 for the marker lens 60 is shared with the light source valve 40 for the tail lamp, the light source valve 40 may be provided discretely as that for the marker lens 60. By using the light source valve 40 discretely provided, the marker lens 60 can also be used as a lens for a turn lamp or the like.

The marker lens 60 is made of a clear and colorless material, and the light emitted through the marker lens 60 is colored by being passed through the clear and red colored outer lens 50. However, for coloring the illumination light, the marker lens 60 or the bulb 41 of the light source valve 40 may be made of a clear and colored material. By making the marker lens 60 or the like with the clear and colored material, it is possible to reduce the number of components and to improve the external appearance.

Although the marker lens 60 is provided in the lamp 10 mounted on the rear side of the vehicle 1, it may be provided in the lamp 10 mounted on the front side of the vehicle 1. Provision of the marker lens 60 in the lamp 10 mounted on the front side thereof allows improvement in assembly of a lamp, for example, a clearance lamp used in the lamp 10. Furthermore, the rigid wall portion 65 of the marker lens 60 is provided between the light receiving lens 61 and the light emitting lens 62, but in addition to the portion, it may be provided between the light-receiving-lens engaging plate 70 and the light-emitting-lens engaging plate 71. Provision of the rigid wall portion 65 also in this portion allows further improvement in the rigidity of the marker lens 60 and in the precision of the illumination range of light.

In the vehicle lamp according to the present invention, the inner lens having the rigid structure is fixed to the elastic fitting portion having also the rigid structure. Therefore, the inner lens is fitted into the lamp housing, i.e., into the elastic fitting portion more securely as compared with that of a vehicle lamp in which an inner lens is assembled to a lamp housing by the action of elasticity of both the inner lens and the lamp housing.

In the vehicle lamp according to the present invention, the inner lens having the rigid structure hardly changes in its shape, and the inner lens having the rigid structure is securely fixed to the elastic fitting portion having also the rigid structure in a state where the inner lens is highly precisely positioned in the elastic fitting portion. Thus, it is possible to improve optical precision.

As explained above, the vehicle lamp according to the present invention is useful for setting the inner lens of the lamp to the fit-in type to allow the assembly of the lamp to be facilitated. In particular, the present invention is suitable for the case where the inner lens (fit-in type lens) is securely fixed to improve the precision of the illumination direction of light.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle lamp comprising:
   a lamp housing;
   an outer lens;
   an inner lens having a rigid structure; and
   a light source,
   wherein the lamp housing includes
   an elastic fitting portion into which the inner lens is elastically fitted, wherein the outer lens has an arrangement relative to the lamp housing such that the outer lens is secured to the lamp housing causing the elastic fitting portion to have a rigid structure, wherein the outer lens is fixed to the lamp housing by welding a joint portion between the outer lens and the lamp housing.

2. The vehicle lamp according to claim 1, wherein the inner lens includes
   a rigid wall portion provided in a direction of elasticity of the elastic fitting portion; and
   two lenses that are integrally formed through the rigid wall portion, and that control light from the light source so as to be illuminated in a predetermined direction.

3. The vehicle lamp according to claim 1, wherein the inner lens includes
   a rigid wall portion provided in a direction of elasticity of the elastic fitting portion; and
   two lenses that are integrally formed through the rigid wall portion, and that control light from the light source so as to be illuminated in a predetermined direction,
   wherein the two lenses are jointed to form an angle.

4. The vehicle lamp according to claim 1, wherein the inner lens includes
   a rigid wall portion provided in a direction of elasticity of the elastic fitting portion; and
   two lenses that are integrally formed through the rigid wall portion, and that control light from the light source so as to be illuminated in a predetermined direction,
   wherein the elastic fitting portion secures the inner lens by causing a plurality of portions of the elastic fitting portion to come in contact with the inner lens when the inner lens is to be secured, by causing the portions to elastically deform in a direction of separation of the portions from the inner lens, and by recovering the elastically deformed portions to their original shapes when the inner lens is secured.

5. The vehicle lamp according to claim 1, wherein the light source is used as a light source for a tail vehicle lamp, and
the inner lens controls light from the light source so as to be illuminated in a direction appropriate for an illumination direction of a rear-side side marker.

6. The vehicle lamp according to claim 1, wherein
the inner lens includes a fitting portion, and
the lamp housing includes a fitting hole into which the fitting portion is fitted.

7. The vehicle lamp according to claim 1, wherein
the inner lens includes an engaging hole, and
the lamp housing includes an engaging portion which is inserted into the engaging hole so that the inner lens and the lamp housing are engaged with each other.

8. The vehicle lamp according to claim 1, wherein the inner lens includes
two lenses that control light from the light source so as to be illuminated in a predetermined direction,
wherein the two lenses are jointed to form an acute angle.

9. A vehicle lamp comprising:
a lamp housing;
an outer lens;
an inner lens having a rigid structure; and
a light source,
wherein the lamp housing includes
an elastic fitting portion into which the inner lens is elastically fitted, wherein the elastic fitting portion is caused to have a rigid structure by the arrangement of the outer lens relative to the lamp housing such that the outer lens is secured to the lamp housing, and the inner lens is fixed to the elastic fitting portion having the rigid structure,
wherein the inner lens includes
a rigid wall portion provided in a direction of elasticity of the elastic fitting portion; and
two lenses that are integrally formed through the rigid wall portion, and that control light from the light source so as to be illuminated in a predetermined direction,
wherein the elastic fitting portion secures the inner lens by causing a plurality of portions of the elastic fitting portion to come in contact with the inner lens when the inner lens is to be secured, by causing the portions to elastically deform in a direction of separation of the portions from the inner lens, and by recovering the elastically deformed portions to their original shapes when the inner lens is secured, and
the rigid wall portion has rigidity in a direction the same as that of the elastic deformation of the elastic fitting portion, wherein the outer lens is fixed to the lamp housing by welding a joint portion between the outer lens and the lamp housing.

10. A method of manufacturing a vehicle lamp, the lamp including
a lamp housing;
an outer lens; and
an inner lens having a rigid structure,
the method comprising:
manufacturing the inner lens;
manufacturing the lamp housing including an elastic fitting portion;
elastically fitting the inner lens into the elastic fitting portion; and
securing the outer lens to the lamp housing, after the elastically fitting, to cause the elastic fitting portion to have a rigid structure, and fixing the inner lens to the elastic fitting portion having the rigid structure, wherein the outer lens is fixed to the lamp housing by welding a joint portion between the outer lens and the lamp housing.

11. A vehicle lamp comprising:
a lamp housing:
an outer lens:
an inner lens having a rigid structure; and
a light source,
wherein the lamp housing includes:
an elastic fitting portion into which the inner lens can be elastically fitted, wherein the outer lens has an arrangement relative to the lamp housing such that the outer lens is secured to the lamp housing causing the elastic fitting portion to have a rigid structure, wherein the elastic fitting portion secures the inner lens by causing an upper portion of the elastic fitting portion to come in contact with an upper portion of the inner lens and a lower portion of the elastic fitting portion to come in contact with a lower portion of the inner lens when the inner lens is to be secured, by causing the upper and lower portions of the elastic fitting portion to elastically deform in a direction of separation of the upper and lower portions of the elastic fitting portion from the inner lens, and by recovering the elastically deformed upper and lower portions of the elastic fitting portion to their original shapes when the inner lens is secured, and wherein the upper and lower portions of the elastic fitting portion extend in directions forming an acute angle with respect to each other.

* * * * *